Oct. 2, 1956
J. H. KALLA ET AL
2,764,925
ROTARY CULTIVATOR
Filed Oct. 24, 1951
2 Sheets-Sheet 1
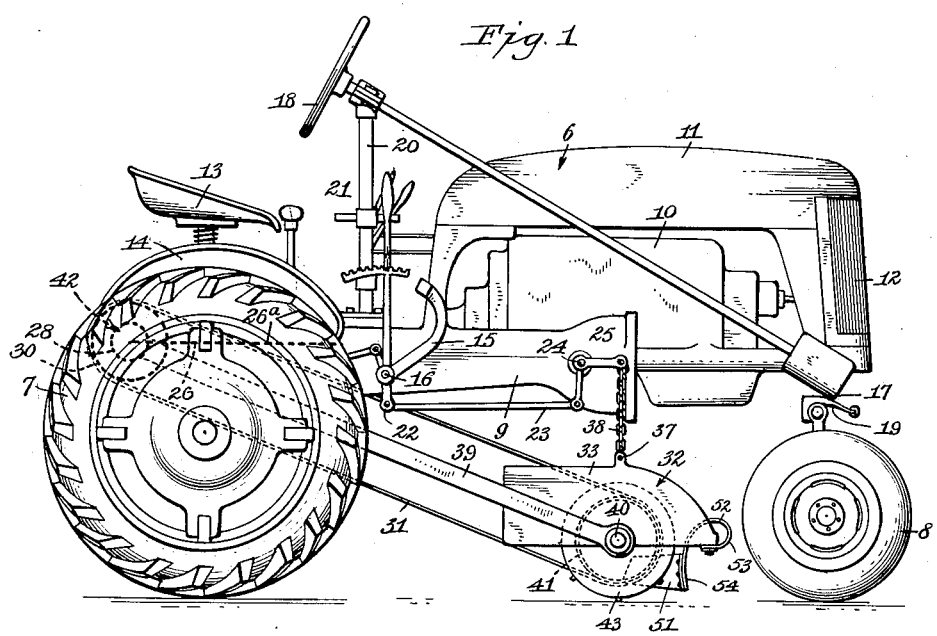
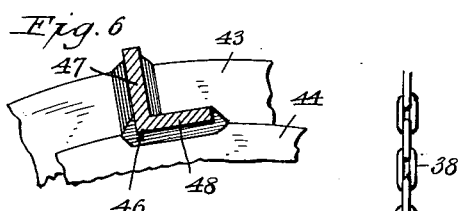
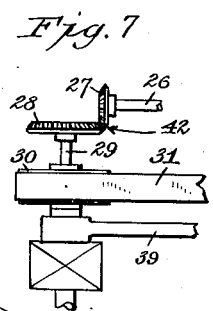
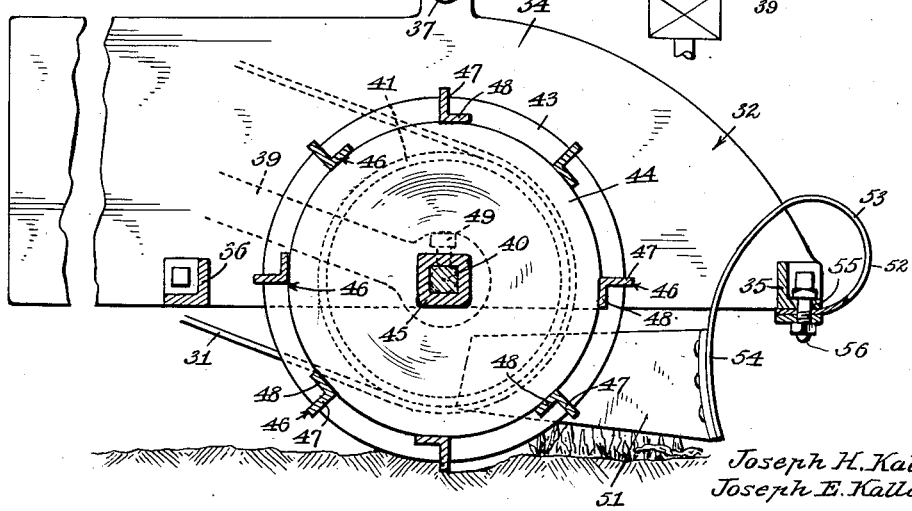
Joseph H. Kalla
Joseph E. Kalla
Inventors,
By Emil Neubart
Attorney Oct. 2, 1956                J. H. KALLA ET AL                2,764,925
                            ROTARY CULTIVATOR
Filed Oct. 24, 1951                                    2 Sheets-Sheet 2
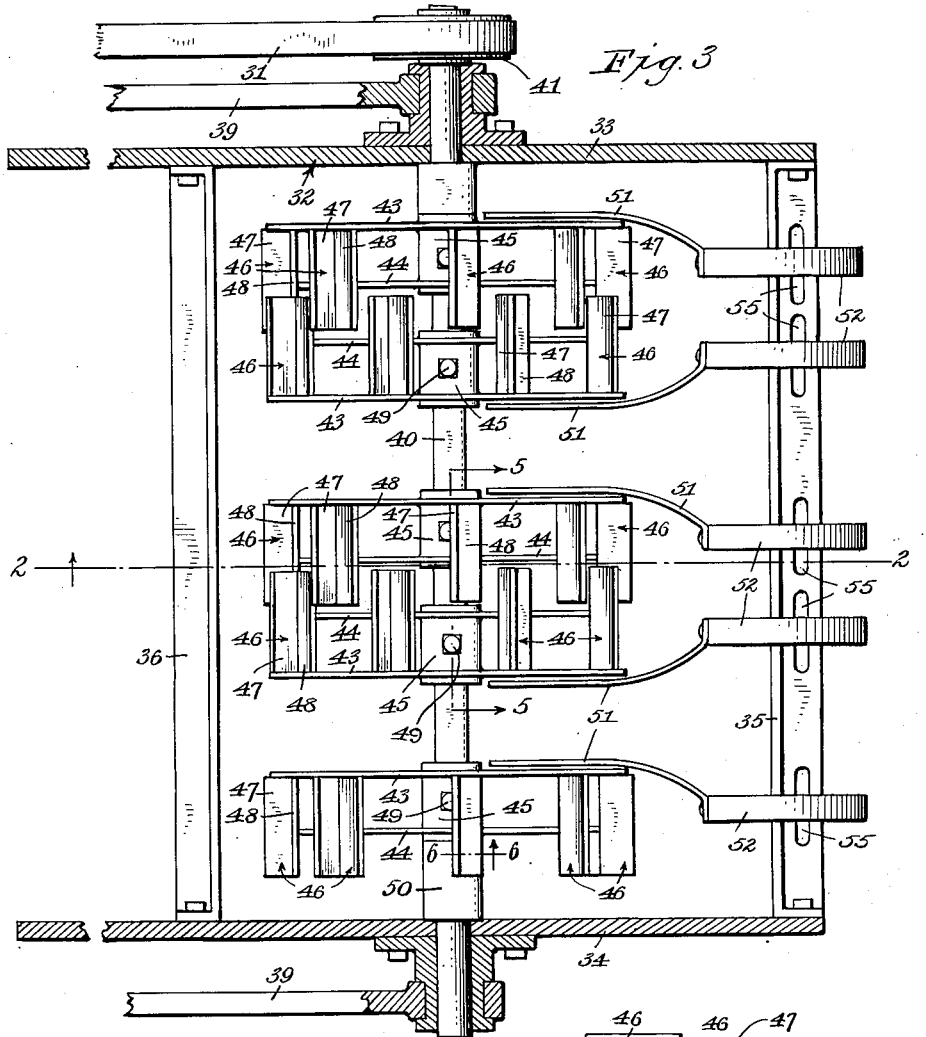

United States Patent Office 2,764,925
Patented Oct. 2, 1956

2,764,925

ROTARY CULTIVATOR

Joseph H. Kalla and Joseph E. Kalla, East Aurora, N. Y.

Application October 24, 1951, Serial No. 252,838

8 Claims. (Cl. 97—215)

This invention relates to improvements in cultivators, and more particularly to such as are adapted for cultivating between rows of growing vegetation.

One of the objects of our invention is to cultivate the soil between rows of growing vegetation and leave the tilled bed even so that the traction wheels of a tractor ride evenly over the tilled bed and the soil is cultivated to the same depth along the elongated areas between the rows of vegetation.

Another object of our invention is to provide digging elements arranged in a rotatable assembly or assemblies and supported so that they enter the soil between adjacent rows of vegetation to the same degree along the entire area over which the cultivator is caused to travel.

A further object is to provide a rotatable cultivator support on which cultivator elements are mounted which are disposed with their lengths at an angle, and preferably at substantially a right-angle, to the line of travel of the cultivator support.

A still further object is to provide a rotatable cultivator serving to chop up weeds between rows of vegetation and to cover the so mutilated weeds so that they have a tendency to decay and so that twigs, sticks, stones, and even heavy roots embedded in the soil become dislodged and in most instances are broken up and delivered in rear of the cultivator with the tilled soil in the form of an even bed over which the wheels of a tractor, to which the cultivator is attached and by means of which it is actuated, will travel freely without tendency to tilt the tractor laterally beyond the lay of the land.

Another and very important object of our invention is to provide a rotatable support, mount thereon a series of disks so as to provide spaced-apart assemblies of disks having their axis at a right-angle to the line of travel of the cultivator and to apply to the edges of the disks of each assembly, elongated digger and disentegrating elements preferably disposed parallel with the axis of said support and contractible or extensible in length for each assembly of disks to conform to the space between the rows of vegetation.

A still further object is to so construct the cultivator that when cultivating the soil between rows of vegetation, the loosened soil will not be distributed onto the rows of vegetation outside of the area being cultivated.

A further object is to provide a cultivator with rotatable disks and apply to the edges or edge portions of said disks, digger and disintegrating elements capable of uprooting weeds, and pulling out twigs, sticks, large roots and other undesirable matter without such matter becoming entangled with the disks and the digger and disintegrating elements.

With the above and other objects to appear hereinafter, our invention consists in the novel features of construction and in the arrangement and combination of parts to be hereinafter described and more particularly pointed out in the subjoined claims.

In the drawings—

Fig. 1 is a side elevation of our improved cultivator shown applied to a tractor; the wheels of which latter are shown riding over the ground and the cultivator somewhat elevated so as to pass idly over the ground.

Fig. 2 is a section taken on line 2—2, Fig. 3.

Fig. 3 is a sectional top plan view of our improved cultivator.

Fig. 4 is a disassembled view of the two sections or units of a cultivator assembly, of which any number may be employed within the framework of the cultivator.

Fig. 5 is a section taken on line 5—5, Fig. 3, the shaft being shown in elevation.

Fig. 6 is an enlarged section taken on line 6—6, Fig. 3, looking in the direction of the arrow crossing said line and showing the manner in which the digger elements may be welded to the disks.

Fig. 7 is a diagrammatic view of the power take-off at the end of the motor shaft.

As illustrated in the drawings, the reference numeral 6 represents a tractor; that shown being one of many makes now in common use on farms. 7 designates the traction wheel at one side of the tractor and 8 the steering wheel at the same side thereof. As will be understood, similar wheels, not shown, are rotatably arranged at the other side of the tractor. 9 designates the frame of the tractor on which a motor 10 of any suitable type is mounted and 11 the hood disposed over the motor and over the radiator 12 at the front end of the tractor. The frame 9 extends rearwardly between the traction wheels and a seat 13 is disposed on this frame in rear of the hood. Spaced from the rear of the hood and between the tractor wheels fenders 14 are arranged. The tractor may have suitable pedals 15 secured to a rock shaft 16 mounted on the frame for actuating suitable brakes with which tractors are invariably provided, control levers for actuating a clutch controlling the operation of the traction wheels 7, and other control mechanism.

Steering mechanism 17 is provided which includes a shaft having a hand wheel 18 at its rear end and which by any suitable means has connection with steering knuckles 19 or other mechanism for actuating the steering wheels 8.

The rear end of the steering mechanism is mounted on a post or support 20 rising from the frame and fitted with suitable control levers to control the operation of the motor or to otherwise serve in controlling the movement and speed of the tractor. All of the parts thus far designated by reference numerals are common in tractors and form no part of our invention.

21 designates a cultivator control lever which may be pivotally mounted on the rock shaft 16 and may have an arm or extension 22 projecting downwardly from the latter to which is pivotally attached a rod 23 extending forwardly therefrom and pivotally connected to a rock shaft 24 journaled in the frame of the tractor and extending from one side to the other thereof. At each end of this rock shaft and at opposite sides of the tractor frame are forwardly extending levers 25 for attachment to the frame of the cultivator in the manner to be hereinafter described.

It is also to be noted that, in tractors, the motor shaft 26 extends rearwardly through and beyond the casing for the transmission mechanism and in Fig. 1 this shaft is indicated by the heavy dotted line additionally numbered 26ª. The top of this transmission casing may serve as a platform on which the seat 13 is supported; that portion of the transmission casing between the seat and the rear end of the hood 11 serving as a footrest and a support or platform should the operator of the tractor desire to stand. The brake pedal and other control elements are consequently in easy reach of the operator, whether in sitting or standing position.

When hereinafter referring to the frame of the tractor it may, in some instances, be considered as including the transmission casing, while in other instances such casings would not be included, since tractors vary in construction and relative disposition of parts.

The portion of the motor shaft extending out of the rear end of the transmission casing is usually referred to as the "power take-off" and as an example, such take-off may include a bevel gear 27 fastened to the rear end of said shaft and in mesh with a bevel gear 28 secured to a shaft 29 disposed at a right angle to the motor shaft, as diagrammatically shown in Fig. 7 and suitably journaled in an extension of the transmission casing; said transverse shaft has a pulley 30 secured thereto around which a belt 31 is adapted to be passed which is to serve for operating the rotatable parts of the cultivator, as will be hereinafter described.

Our improved cultivator comprises a frame 32 which may be variously constructed, but as shown comprises two side members 33, 34 connected and held spaced apart by a transverse front member 35 which may be in the form of an angle iron and by a similar rear member 36. These side members are in the form of plates and may have a hanger bar 37 at their upper ends connecting their upper regions in spaced relation and to which the lower ends of chains or other flexible hangers 38 are secured. The said chains are spaced apart and have their upper ends secured to the outer free ends of the forwardly-extending levers 25 disposed at opposite sides of the tractor frame 9 so that upon actuating the cultivator control lever 21, the cultivator frame 32 may be raised or lowered to position the same so that the entire cultivator is raised to any extent above the soil or so that it may be lowered to bite into the soil according to the requirements for properly cultivating the same, which depends on the nature of the soil and to a considerable degree on the foreign matter embedded in the soil. It is, of course, to be understood that any other means for raising and lowering the cultivator frame may be employed, as the mechanism shown for this purpose is merely illustrative and may not be suitable for all types of tractors.

In the drawings we have shown the cultivator frame as movable in a vertical direction with the movement restricted to an arc of a circle, since the cultivator is provided at each side thereof with a thrust arm or boom 39, the rear ends of which are pivotally secured in any approved manner to the frame of the tractor with their axes coincident with the axis of the power take-off pulley 30.

The pivotal connections of the thrust arms 39, or thrust-booms as they may be termed, may be applied to any portion of the tractor frame or any fixed part or parts attached to the latter so long as their axes are coincident with that of the pulley 30.

Rotatable in suitable bearings fastened to the side members of the cultivator frame 32 is a shaft 40; it being parallel with the transverse front and rear members 35, 36. The front ends of the thrust arms or booms surround such bearings and provide pivotal connections for said arms or booms to said frame, which pivotal connections have their axes coincident with the axis of the shaft 40 and which shaft may be termed the cultivator shaft. On this shaft a pulley 41 is secured around which the belt 31 passes. Therefore the cultivator shaft 40 may be rotated from the power take-off mechanism 42, comprising the bevel gears 27, 28, a shaft 29, the pulley 30 and such other parts associated therewith as any mechanic is capable of installing for controlling the actuation of the cultivator pulley and consequently the actuation of the cultivator shaft 40. It is, of course, understood that in lieu of the pulleys 30, 41, and the belt 31, a gear-and-shaft mechanism may be substituted for the same inasmuch as there are various ways to impart rotative movement to the cultivator shaft from the power take-off rear end of the motor shaft.

While our invention includes means to rotate the cultivator shaft by mechanism interposed between the latter and some rotatable element of the motor 10 or from some rotatable element actuated by the motor, it is not our intention to limit this invention to the means illustrated in the drawings hereof, nor to the provision made for counteracting thrusts or resistance areas encountered by the cultivator during its forward movement, except when the claims hereof specifically include such elements or means.

We preferably construct the cultivator shaft so that the part thereof disposed between the side members or plates 33, 34 of the cultivator frame is of square or other non-circular formation in cross section and on the non-circular portion of this shaft we mount cultivator assemblies and in some instances a cultivator unit or units so that they rotate with the cultivator shaft and are adjustable lengthwise along the same. Each cultivator unit comprises two disks 43, 44 which are held in spaced relation by a hub 45 to which said disks are firmly attached; one of said disks being of smaller diameter than the other and having a circular series of digger bars 46 welded or otherwise rigidly secured between their ends to the edge thereof. One end of each digger bar is rigidly secured to the side of the other or larger disk of the cultivator unit facing the smaller disk by welding or otherwise permanently securing the same thereto. So arranged these digger bars are parallel with the axes of said disks and the difference in the diameters of the disks is such that the digger bars extend outwardly a short distance beyond the outer edge of the larger disk of each cultivator unit. The attachment of these digger bars to the edge of the smaller disk of each unit is such that a portion of each bar bridges the space between the two disks and a portion outwardly overhangs the smaller disk. These digger bars are spaced equi-distantly around the disks and may vary in number, depending on the nature of the soil to be cultivated, but we have found that a circular series of eight digger bars rigidly fastened to the disks of each unit in the manner stated serve all practical purposes. We have also found that such digger bars made of angle irons are more effective than any other type of digger bar and it is essential that the digger bar or some portion thereof be disposed radially and extend outwardly from the edge of the smaller disk of each cultivator unit. When angle bars are employed, each bar has a radially extending web 47 and a web 48 disposed at a right angle thereto or tangentially to the edge of the small disk of each unit. The webs 48 therefore serve as guards to prevent most of the soil being thrown upwardly out of control during the rotation of the cultivator unit and also limit the extent to which the radially disposed web of each digger bar enters the soil, or at least retards such action, thereby overcoming any tendency on the part of the cultivator to dig into the soil sufficiently to arrest the motion of the tractor along the stretch of soil to be cultivated.

As clearly shown in Fig. 2, the hub of each cultivator unit is of square formation in cross section and has an opening therethrough conforming to the shaft over which it is slipped and it is provided with a set screw 49 which is tightened to impinge against the shaft and retain the cultivator unit in any desired position along the shaft. These cultivator units are used in pairs, oppositely disposed, and such pairs we prefer to term cultivator assemblies.

As clearly shown in Fig. 3, a cultivator unit is mounted on the shaft near one side member or plate of the cultivator frame and this is spaced from said side member by a spacing sleeve 50 bearing at one end against the hub 45 of said unit and at its other end against the adjacent side member or plate of the cultivator frame; the smaller disk of this unit being closer to said side member than the larger disk and consequently the digger bars 46 of this unit overhang the space between the smaller disk 43 and the said side member or plate.

The cultivator assemblies are spaced apart along the cultivator shaft and the cultivator units of each assembly are oppositely disposed so that the two large disks of the two units forming the assembly are at the outside of the assembly and the small disks of the two units are disposed between the large disks and are in opposing relation with the digger bars of each unit oppositely overhanging the space between the two small disks. The digger bars of one cultivator unit in each assembly are staggered with relation to the digger bars of the coacting cultivator unit and therefore the units of each assembly may be considered as telescopic units, since the digger bars of one cultivator unit overlap those of the other and therefore the assemblies may be widened or narrowed, but in all instances the radially-extending webs 47 of the digger bars jointly extend from one large or end cultivator disk to the other large or end cultivator disk. It will be apparent, therefore, that each cultivator assembly may be widened or narrowed and retained on the shaft in adjusted positions by the set screws 49 passed through the hubs thereof and such relative adjustment of the cultivator units is made according to the width of the spaces between rows of vegetation, the soil of which requires cultivation.

It will also be understood that the cultivator assemblies are relatively adjustable along the shaft so as to enlarge or diminish the spaces between them and the space between the cultivator unit at one end of the shaft and the adjacent side member or plate of the cultivator frame. Such adjustment relatively of the cultivator assemblies and the assembly adjacent the cultivator unit at the end of the shaft is made to conform to the width of the rows of vegetation between the rows of soil to be cultivated. As constructed the cultivator assemblies and the end unit associated therewith may be adjusted along the shaft so that the soil between the rows of vegetation can be cultivated extremely close to the roots or bases of the plants and since the digger bars of each unit at their greatest degree of extension present radially extending digger webs designed to enter the soil between the large end disks of the assemblies, all portions of the soil in the width of the space cultivated between rows of plants will be dug into with assurance that the weeds will become uprooted, twigs and sticks in the soil become broken-up and stones and other heavier foreign matter pulled out of the soil and thrown back by the digger bars or elements. Portions of the soil in such miscellaneous matter strike the radially extending web preceding the web in action and deflect the soil so that it gravitates and leaves the uprooted smaller weeds fully covered with the soil, as well as the roots of the larger weeds so that they decay, and also break up twigs and sticks lodged lengthwise in the soil and under action of the disks cut up twigs and sticks when lodged transversely in the soil, with the result that the twigs and sticks are thrown backward with the soil and also become covered, while stones and matter heavier than twigs and sticks are also thrown backwardly and find lodgment in new places in the soil with all soil evenly distributed so that the traction wheels of the tractor pass over even stretches of soil at opposite sides of rows of vegetation and assure equal penetration of the cultivator assemblies from one end of the field to be cultivated to the other end thereof.

By utilizing plates, such as shown at 33, 34, as the side members of the cultivator frame, the soil and other matter torn up and thrown rearwardly is prevented from being spread laterally beyond the area worked by the cultivator, and it is to be noted that said plates or side members extend rearwardly a considerable distance beyond the transverse rear member 36.

While in Fig. 3 of the drawing we have shown a cultivator having two cultivator assemblies and a single cultivator unit, each of which provide a circular series of digger bars, it will be apparent that such assemblies may be reduced to a single assembly or increased in number over that shown, said single cultivator unit when used having only one-half the number of digger bars of each assembly; also that certain advantages derived from the use of this invention may be had by employing the cultivator units singly, and not in couples to form what we have termed the cultivator assemblies capable of being widened or narrowed, as may be desired.

Manifestly, when using the cultivator units in non-telescoping relation so as to form the cultivator assemblies, such units will require digger bars of different lengths, and in applying the same to the cultivator shaft the length of the digger bars will determine their ability for use to cultivate the soil between the rows of vegetation. However, by using the units in pairs and in telescoping relation, the digger bars of all units may be of even length. The cultivator units constructed as described and the cultivator assemblies formed by a pair of such units, prevent entanglement of rank growth, sticks, twigs and other such foreign matter with the digger bars, since in all instances all such foreign matter as would become lodged between rows of vegetation would become broken-up and if not disintegrated would, nevertheless, be projected rearwardly with the soil under the rotation of the cultivator unit and/or cultivator assemblies.

The cultivator is preferably positioned in the space between the steering wheels and the traction wheels of a tractor and is so shown in the drawings, but it is to be understood that it may be used as a drag by attaching the same to the rear of the tractor, or it may be otherwise positioned and suitable driving mechanism provided for the same, of which the motor shaft or a shaft driven by the motor will serve as the prime mover. Situated as shown, the thrust arms or booms 39 serve as stabilizers for the cultivator and retain the same in parallel relation to the traction wheels and at the same time prevent digging into the soil to a degree which would cause stoppage of the cultivating operation.

The tractor travels at a comparatively slow speed while the cultivator shaft is rotated at a comparatively high speed and consequently successive digger bars in each circular series come into action against the soil and any foreign matter lying thereon or lodged therein; thus assuring complete uprooting of all weeds, disintegration of twigs, and dislodgment of stones and similar matter, all of which are directed rearwardly without possibility of becoming entangled in the cultivating mechanism, particularly since the disks 43, 44 dig into the ground to a certain extent and as the weight of the cultivator frame and the parts carried thereby under control of the chains 38 determine the degree of entrance of the disks and the digger bars into the soil, under the control of said chains and associated parts, or other suitable raising-and-lowering mechanism, the depth to which the soil is cultivated will be under full control of the operator, regardless of the mechanism used for raising and lowering the cultivator.

The adjustment of the cultivator assemblies along the shaft is also made according to the width of the rows of vegetation and the spaces between such rows, the spaces between the cultivator assemblies and between the cultivator unit at one end of the shaft, when so used, and the adjacent cultivating assembly being enlarged or diminished according to the width of the rows of vegetation over which the cultivator is to be passed.

Although we have shown the cultivator shaft 40 non-circular in cross section to prevent rotation of the cultivator units and/or the cultivator assemblies thereon, such shaft may be cylindrical and the units or assemblies keyed or otherwise fastened thereto.

In order to gather up any drooping vegetation at the sides of the rows and to bunch or crowd the stems and foliage of such vegetation into more compact space so as not to be mutilated during the passage of the cultivator over the same, we provide foliage deflectors 51 which extend into the spaces between the cultivator assemblies and the cultivator unit at one end of the cultivator shaft and the adjacent assembly; such deflectors being preferably in the form of curved blades which are fastened to the transverse front member 35 of the cultivator frame by means of springs 52. The blades may be of the shape shown in Fig. 2 or may be otherwise shaped but preferably to provide forwardly-flaring spaces between the front ends of cooperating blades. In the event of these deflectors striking an obstruction, the springs 52 flexibly supporting the same yield and permit the deflectors to pass over such obstruction. The springs 52 have one end of horseshoe formation, as at 53, and one end of this horseshoe-shaped-portion is extended downwardly, as at 54, and has the front end of a deflector 51 riveted or otherwise secured thereto. The rear portions of these deflectors lie in close proximity to the large disks of each cultivator assembly and to the large disk of the cultivator unit, which we prefer to use at one end of the cultivator shaft.

Since the deflectors or deflector plates 51 are to be maintained in close proximity to the opposing disks of adjacent cultivator assemblies under all adjustments of the latter along the cultivator shaft, the front member 35 of the frame is slotted, as at 55, and passed through the upper or securing ends of the springs 52 and through said slots 55 are bolts 56; thus enabling the springs to be adjusted laterally along said front member in conformity with any adjustment made of the cultivator assemblies, or a cultivator unit when used, along said shaft.

It is to be understood that the disks 43, 44 may also be considered as carriers or carrier elements which have the digger bars 46 secured thereto and these carriers or carrier elements may be in form or structure other than disks, although such carriers when in the form of disks, also serve to enter the soil and sever or cut-up twigs, sticks, and similar matter that may be encountered in the act of cultivating the soil.

The extensions outwardly of the secured ends of the digger bars or digging elements 46 slightly beyond the edge of the large disk 43 of each cultivator unit serves to co-act with the edge of such disk for nipping into the soil close to the roots of the vegetation being cultivated or where such vegetation rises from the soil and in this manner the soil is loosened or broken down from row to row of the vegetation and all growth between the rows destroyed and trajected backwardly or rearwardly with the loosened soil and all other matter foreign to the vegetation being cultivated.

On approaching a field to be cultivated, the cultivator is raised to an extent that the cultivating mechanism will not come in contact with an obstruction on the road or any elevated portion of the terrain over which the tractor is driven. Upon reaching the field and positioning the tractor for cultivating action the wheels of the tractor at opposite sides thereof will straddle one or more rows of vegetation, after which the cultivator assemblies are adjusted along the shaft with respect to each other and the cultivator unit at the end of the shaft according to the spacing of the rows of vegetation and the width of the rows of vegetation and so that the cultivator assemblies, and a cultivator unit if used as such, is positioned over the soil between rows of vegetation; whereupon the operator, through the medium of the raising-and-lowering mechanism shown and described or any other suitable mechanism employed for that purpose, allows the cultivator to gravitate and enter the soil to the extent that the weight of the cultivator permits under control of such raising-and-lowering mechanism. The tractor is then moved forward, with the result that the cultivator assemblies mounted on the cultivator shaft are driven at a high rate of speed while entered to a certain extent into the soil, thereby causing all soil and foreign matter to be dug up and trajected rearwardly in the manner stated and for the purposes intended; rotation of the cultivator shaft on which the cultivator assemblies and unit are mounted being controlled by the operator in any suitable manner.

Having thus described our invention, what we claim is:

1. A cultivator element for attachment to a rotatable shaft, comprising a hub securable to said shaft, a pair of spaced-apart cutter disks extending from said shaft, said disks being of different diameters, and a circular series of digger-bars secured to the edge of the smaller of said disks and to the face of the larger of said disks at the side thereof confronting the smaller of said disks, said digger bars having radially-disposed digger portions allowing free entrance thereof into the soil and said radially-disposed digger portions extending radially slightly outwardly beyond the edge of the larger of said cutter disks to coact with said edge to nip vegetation close to the roots of the latter while being cultivated.

2. A cultivator element for attachment to a rotatable shaft, comprising a hub securable to said shaft, a pair of spaced-apart disks extending from said shaft, said disks being of different diameters, and a circular series of digger-bars secured to the edge of the smaller of said disks and to the face of the larger of said disks at the side thereof confronting the smaller of said disks, the digger-bars extending radially outwardly beyond the edge of the larger disk and overhanging the smaller disk at the side thereof distant from the larger disk.

3. A cultivator element for attachment to a rotatable shaft, comprising a hub securable to said shaft, a pair of spaced-apart disks extending from said shaft, said disks being of different diameters, and a circular series of digger-bars secured to the edge of the smaller of said disks and to the face of the larger of said disks at the side thereof confronting the smaller of said disks, the digger-bars having a radially-extending web and a soil-retarding web at an angle to said radially-extending web and overhanging the smaller disk at the side thereof distant from the larger disk.

4. A cultivator element for attachment to a rotatable shaft, comprising a hub securable to said shaft, a pair of spaced-apart disks extending from said shaft, said disks being of different diameters, and a circular series of digger-bars secured to the edge of the smaller of said disks and to the face of the larger of said disks at the side thereof confronting the smaller of said disks, each of said digger-bars being of angular formation in cross section to provide a digger-web and a soil-retarding and distributing web when the cultivator element is under rotation with said disks marginally entered in the soil being cultivated.

5. A cultivator element adapted to be mounted on a rotatable shaft and comprising a hub secured to said shaft, two spaced-apart disks extending from said hub and having their axes coincident with the axis of said hub, one of said disks being of larger diameter than the other, a circular series of digger-bars of L-shaped formation in cross-section having one of their webs extending radially and their other webs at substantially right-angles to said radially extending webs, one end of each of said digger-bars being secured to the side of the larger disk confronting the smaller disk at the marginal portion of said larger disk and each digger-bar being secured at an intermediate point in its length to the edge of the smaller disk, the radially-extending webs of said digger-bars extending outwardly beyond the edge of the larger disk and the other webs of said digger-bars extending along the inner edge of said radially-extending webs, said digger-bars having their other ends extending freely to overhang the smaller of said disks.

6. A cultivator unit for attachment to a rotatable shaft, comprising a pair of spaced-apart disks extending from said shaft, a circular series of digger bars secured to the edge of one of said disks and to the face of the other of said disks at the side thereof confronting said first-mentioned disk, and means embodied in the construction of each cultivator unit at the edge of one of said disks to nip and free the soil, weedage and other foreign matter in close proximity to the roots of the vegetation being cultivated where it rises from the soil.

7. A cultivator element for attachment to a rotatable shaft, comprising a pair of spaced-apart disks extending from said shaft, said disks being of different diameters, and a circular series of digger bars secured to the edge of the smaller of said disks, said digger bars having one of their ends secured to the face of the larger of said disks at the side thereof confronting the smaller of said disks, said digger bars having also a radially-disposed portion extending outwardly from the edge of the larger of said disks with said bars terminating in the plane of the inner face of said disks to nip and free the soil, weedage and other foreign matter in close proximity to the vegetation being cultivated where it rises from the soil.

8. A cultivator unit for attachment to a rotatable shaft, comprising a pair of spaced-apart disks extending from said shaft, said disks being of different diameters, and a circular series of digger bars secured between their ends to the edge of the smaller of said disks and to the face of the larger of said disks at the side thereof confronting the smaller of said disks, the digger bars extending outwardly beyond the edge of the larger of said disks and cooperating with the edge of the latter to nip and free the soil, weedage and other foreign matter in close proximity to the vegetation being cultivated where it rises from the soil.

References Cited in the file of this patent

UNITED STATES PATENTS

| Number | Name | Date |
|---|---|---|
| Re. 19,242 | Miller et al. | July 17, 1934 |
| 818,876 | Dorris | Apr. 24, 1906 |
| 899,270 | Stauffer | Sept. 22, 1908 |
| 1,025,961 | Clark | May 14, 1912 |
| 1,364,720 | Cook | Jan. 4, 1921 |
| 1,543,515 | Pickard | June 23, 1925 |
| 1,896,391 | Chong et al. | Feb. 7, 1933 |
| 2,117,065 | Lassas | May 10, 1938 |
| 2,279,652 | Beard | Apr. 14, 1942 |
| 2,569,464 | Edwards et al. | Oct. 2, 1951 |
| 2,590,790 | Pettman | Mar. 25, 1952 |
| 2,694,967 | Severance | Nov. 23, 1954 |
| 2,712,785 | Severance | July 12, 1955 |

FOREIGN PATENTS

| Number | Country | Date |
|---|---|---|
| 577,193 | France | May 30, 1924 |
| 67,524 | Denmark | Aug. 30, 1948 |